United States Patent
Hundley et al.

(10) Patent No.: US 9,764,880 B2
(45) Date of Patent: Sep. 19, 2017

(54) HOPPER COVER

(71) Applicant: The Vollrath Company, L.L.C., Sheboygan, WI (US)

(72) Inventors: Jill Hundley, Sheboygan, WI (US); Richard Koehl, Sheboygan Falls, WI (US); Ken Wetenkamp, Plymouth, WI (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 6 days.

(21) Appl. No.: 15/017,119

(22) Filed: Feb. 5, 2016

(65) Prior Publication Data

US 2017/0225853 A1    Aug. 10, 2017

(51) Int. Cl.
| | |
|---|---|
| B65D 51/02 | (2006.01) |
| B65D 43/02 | (2006.01) |
| B65D 1/36 | (2006.01) |
| B65D 25/24 | (2006.01) |
| B65D 25/28 | (2006.01) |

(52) U.S. Cl.
CPC ............... *B65D 51/02* (2013.01); *B65D 1/36* (2013.01); *B65D 25/24* (2013.01); *B65D 25/2826* (2013.01); *B65D 43/022* (2013.01)

(58) Field of Classification Search
CPC .... B65D 51/02; B65D 51/28; B65D 51/2807; B65D 51/24; B65D 1/36; B65D 25/24; B65D 25/04; B65D 25/22; B65D 25/2806; B65D 43/022; B65D 43/0214; B65D 43/0202
USPC ....... 220/521, 522, 507, 212, 628, 555, 553; 222/173, 146.6, 130
See application file for complete search history.

(56) References Cited

U.S. PATENT DOCUMENTS

| | | | |
|---|---|---|---|
| 2,038,218 A | 4/1936 | Holt | |
| 2,640,622 A * | 6/1953 | Sabatino | ............... A01K 97/08 |
| | | | 220/324 |
| 3,979,007 A | 9/1976 | Thornbloom, Jr. | |
| 4,300,700 A | 11/1981 | Chang | |
| 4,611,713 A | 9/1986 | Byrns | |
| 4,614,859 A | 9/1986 | Beckering et al. | |
| 4,947,739 A | 8/1990 | Owen | |
| 5,441,163 A * | 8/1995 | Carrasco | .................. B25H 3/06 |
| | | | 206/373 |

(Continued)

FOREIGN PATENT DOCUMENTS

| | | |
|---|---|---|
| GB | 2 279 233 | 1/1995 |
| WO | WO 2015/038360 | 3/2015 |

OTHER PUBLICATIONS

Search Report and Written Opinion for International Application No. PCT/2017/015823, dated Jun. 2, 2017, 9 pages.

*Primary Examiner* — Robert J Hicks
(74) *Attorney, Agent, or Firm* — Foley & Lardner LLP

(57) ABSTRACT

A hopper cover for a dispensing machine includes an exterior side having an exterior surface and an interior side having an interior surface that defines a plurality of recesses. The plurality of recesses are configured to receive a plurality of components of the dispensing machine. Each recess of the plurality of recesses corresponds with a specific component of the plurality of components. The hopper cover is configured to cover a hopper cavity of the dispensing machine when in a first orientation and facilitate organized disassembly and reassembly of the dispensing machine when in a second orientation.

17 Claims, 9 Drawing Sheets

(56) References Cited

U.S. PATENT DOCUMENTS

| | | | |
|---|---|---|---|
| 5,826,718 A * | 10/1998 | Ahern, Jr. ............. | B25H 3/021 |
| | | | 206/372 |
| 6,176,499 B1 | 1/2001 | Conrado et al. | |
| 6,968,969 B1 | 11/2005 | McKinnon, Jr. | |
| 7,784,640 B2 | 8/2010 | Matsutori et al. | |
| 7,854,321 B2 | 12/2010 | Twig et al. | |
| 2002/0189269 A1 | 12/2002 | Midden et al. | |
| 2004/0178208 A1 | 9/2004 | Leba et al. | |
| 2004/0232637 A1 | 11/2004 | Butler | |
| 2006/0037872 A1 | 2/2006 | Steiner | |
| 2010/0000893 A1 * | 1/2010 | Twig ..................... | B25H 3/023 |
| | | | 206/373 |
| 2016/0000269 A1 | 1/2016 | Van Puijenbroek et al. | |

\* cited by examiner

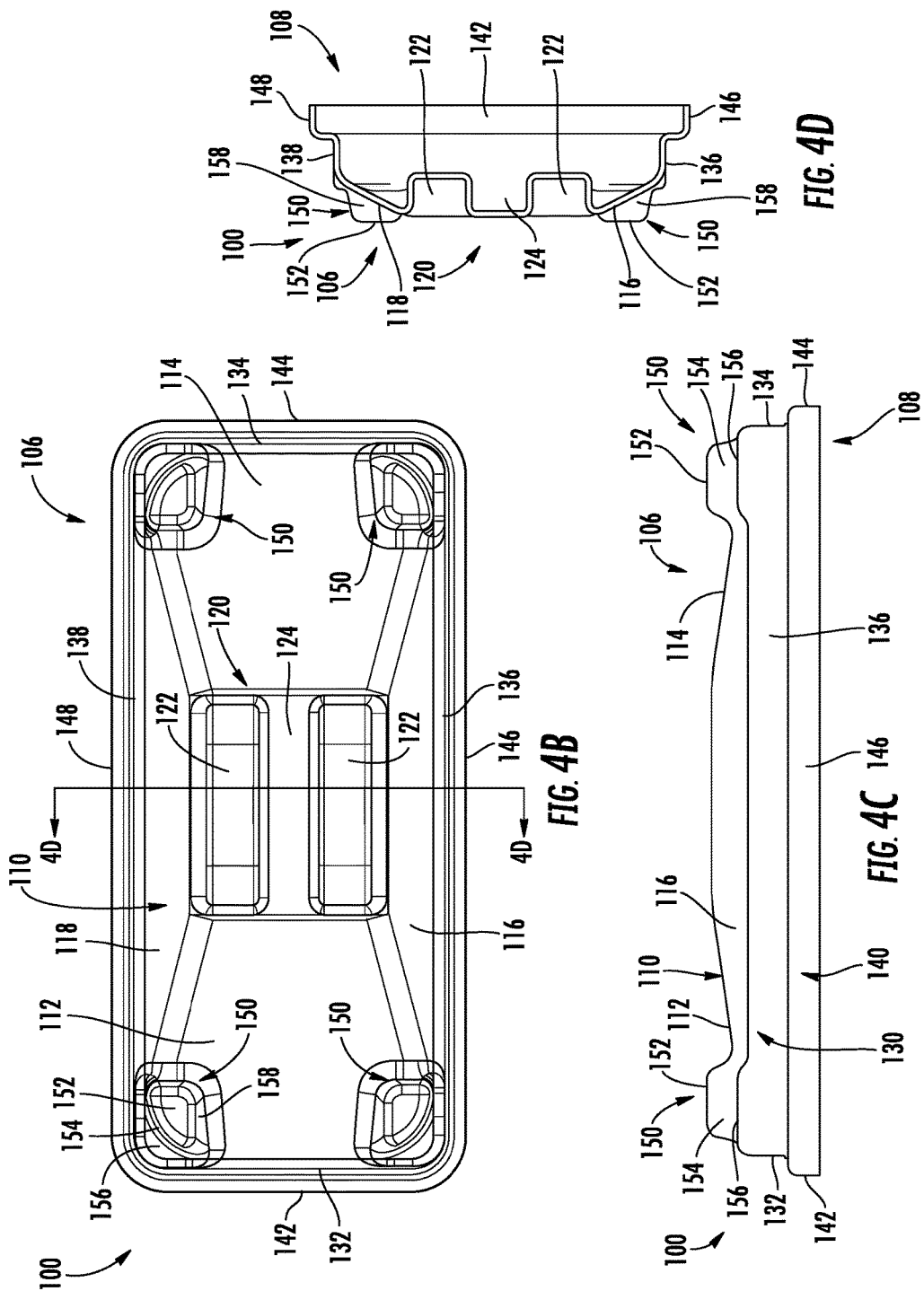

HOPPER COVER

BACKGROUND

Dispensing machines, such as frozen treat (e.g., frozen yogurt, ice-cream, custard, slushie, etc.) dispensing machines, require cleaning and periodic maintenance and/or repair. Disassembly of such dispensing machines may be a messy process and it may be difficult to keep track of all of the components removed from the dispensing machine. Often, some components are left within the dispensing machine and do not get cleaned or some components are not reinstalled onto the machine, thereby affecting the performance of the dispensing machine and/or the quality of the frozen treat. Also, regular maintenance may require the replacement of certain components (e.g., wear components).

SUMMARY

One exemplary embodiment relates to a hopper cover for a dispensing machine. The hopper cover includes an exterior side having an exterior surface and an interior side having an interior surface that defines a plurality of recesses. The plurality of recesses are configured to receive a plurality of components of the dispensing machine. Each recess of the plurality of recesses corresponds with a specific component of the plurality of components. According to an exemplary embodiment, the hopper cover is configured to cover a hopper cavity of the dispensing machine when in a first orientation and facilitate organized disassembly and reassembly of the dispensing machine when in a second orientation.

Another exemplary embodiment relates to a cover for a dispensing machine. The cover includes a first side including a plurality of feet, an opposing second side including a surface, and an extension structure positioned around a periphery of the cover and extending past the surface of the opposing second side, defining a cavity therebetween. According to an exemplary embodiment, the plurality of feet have a face shaped to correspond with at least one of a ledge and an interior surface of an opening of the dispensing machine.

Still another embodiment relates to a hopper cover for a dispensing machine. The hopper cover includes a first side and an opposing second side defining a plurality of recesses. The hopper cover is configured to extend over a hopper of the dispensing machine. The plurality of recesses are configured to receive a plurality of components of the dispensing machine during disassembly of the dispensing machine.

The invention is capable of other embodiments and of being carried out in various ways. Alternative exemplary embodiments relate to other features and combinations of features as may be recited in the claims.

BRIEF DESCRIPTION OF THE DRAWINGS

The disclosure will become more fully understood from the following detailed description, taken in conjunction with the accompanying figures, wherein like reference numerals refer to like elements, in which:

FIGS. 4A-4G are various views of a hopper cover, according to an exemplary embodiment;

DETAILED DESCRIPTION

Figure 1:
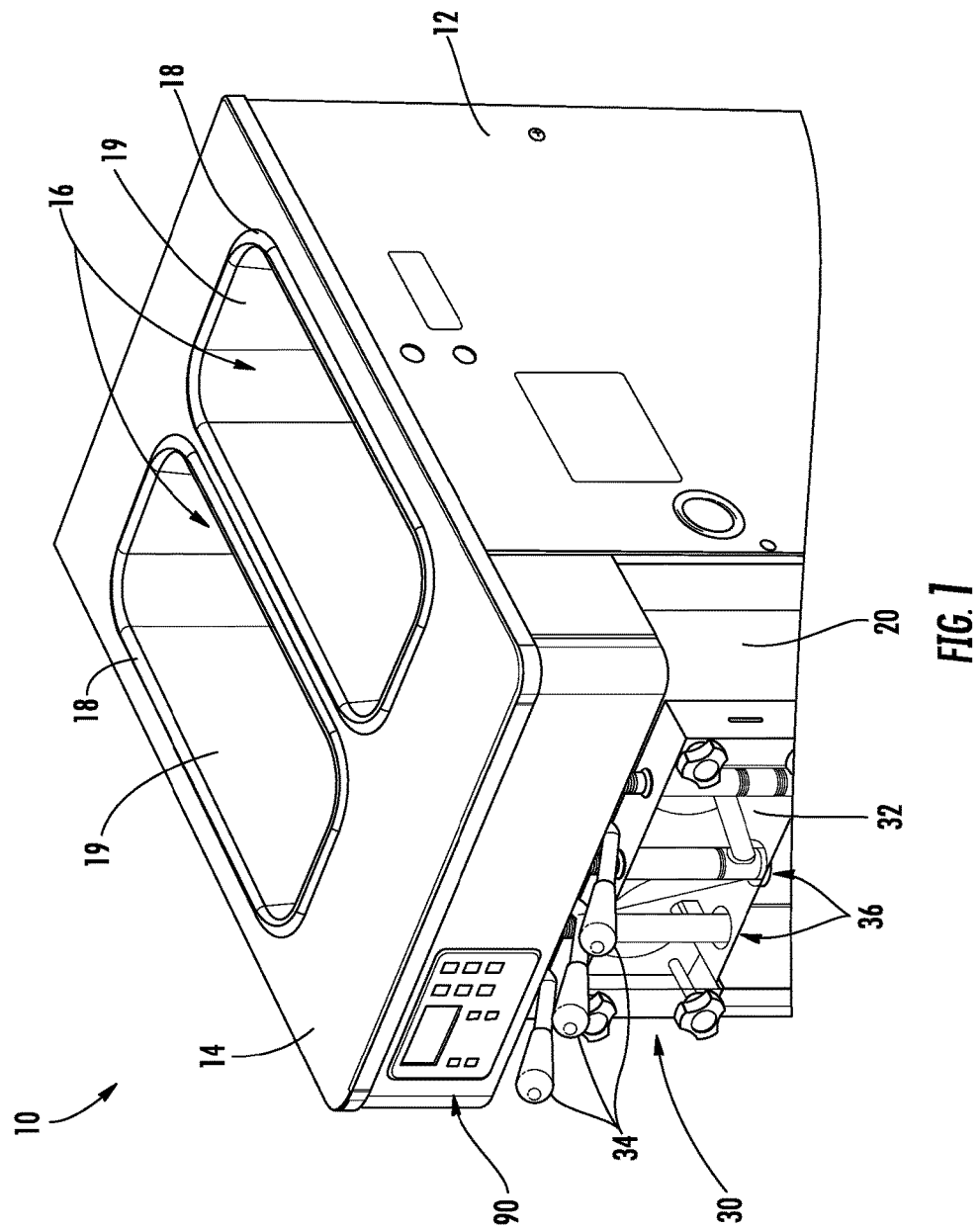
FIG. 1 is a perspective view of a two-barrel dispensing machine, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a multi-functional cover is used with a dispensing machine (e.g., a frozen yogurt dispensing machine, etc.) to assist, sort, track, and/or organize the disassembly, cleaning, and assembly of the dispensing machine. The cover is configured to extend across (e.g., fit over, cover, etc.) a hopper opening or cavity that provides access to the interior of a hopper for the dispensing machine. When placed in position over the hopper opening, the cover has an interior side (e.g., a side facing the inside of the dispensing machine, etc.) and an exterior side (e.g., a side facing the outside of the machine, the exterior environment, etc.). In one embodiment, the exterior side of the cover defines recesses that provide a handle or grip for lifting and handling the cover. In some embodiments, the exterior side of the cover includes legs extending therefrom such that the cover may stand on the legs when the exterior side is oriented downwards (e.g., the exterior side faces a surface such as a table or counter, etc.). According to an exemplary embodiment, the interior side of the cover defines various recesses shaped to receive various removable parts of the dispensing machine and/or tools used with the dispensing machine. Thus, when the cover is removed from the hopper opening and oriented with the interior side up, an individual part or tool may be removed from the dispensing machine and placed in the corresponding recess of the cover. The recesses may help to secure the parts in the cover. The recesses may also serve as a guide or indicator of which parts need to be removed and/or replaced and whether the disassembly or re-assembly is complete (e.g., provide an indication of which parts remain in the dispensing machine to be removed, to be reinstalled, etc.). After the dispensing machine is disassembled, the cover and parts may be taken to a cleaning area for cleaning. The cover thereby provides an organizational tool for use when cleaning, maintaining, and/or repairing the dispensing machine.

According to the exemplary embodiment shown in FIGS. 1-4G, a multi-functional cover, shown as hopper cover 100, is used with a dispensing machine, shown as dispensing machine 10, to assist, sort, track, and/or organize the disassembly, cleaning, and assembly of the dispensing machine 10. According to the exemplary embodiment shown in FIGS. 1-3, the dispensing machine 10 is a multi-barrel (e.g., a two-barrel, etc.) frozen yogurt dispensing machine configured to dispense multiple types of frozen yogurt (e.g., a first flavor, a second flavor, a swirl or combination flavor, etc.). In other embodiments, the dispensing machine 10 is a single-barrel frozen yogurt dispensing machine. In still other embodiments, the dispensing machine 10 is another type of dispensing machine (e.g., a frozen treat dispensing machine, an ice-cream dispensing machine, a custard dispensing machine, a slushie machine, etc.) configured to dispense something other than frozen yogurt (e.g., ice-cream, custard, slushie, etc.).

Figure 2:
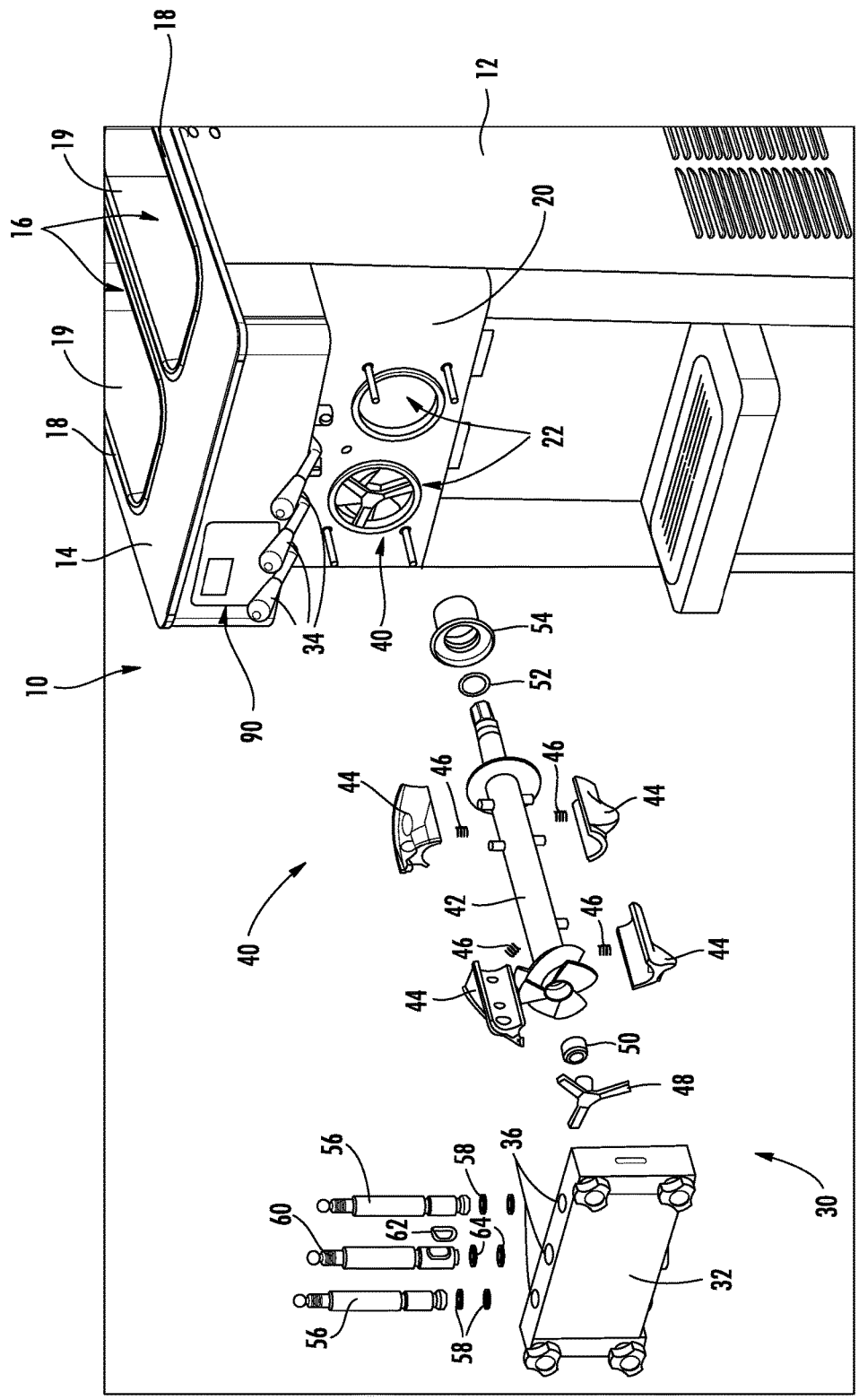
FIG. 2 is an exploded perspective view of the two-barrel dispensing machine of FIG. 1, according to an exemplary embodiment.
Figure 3:
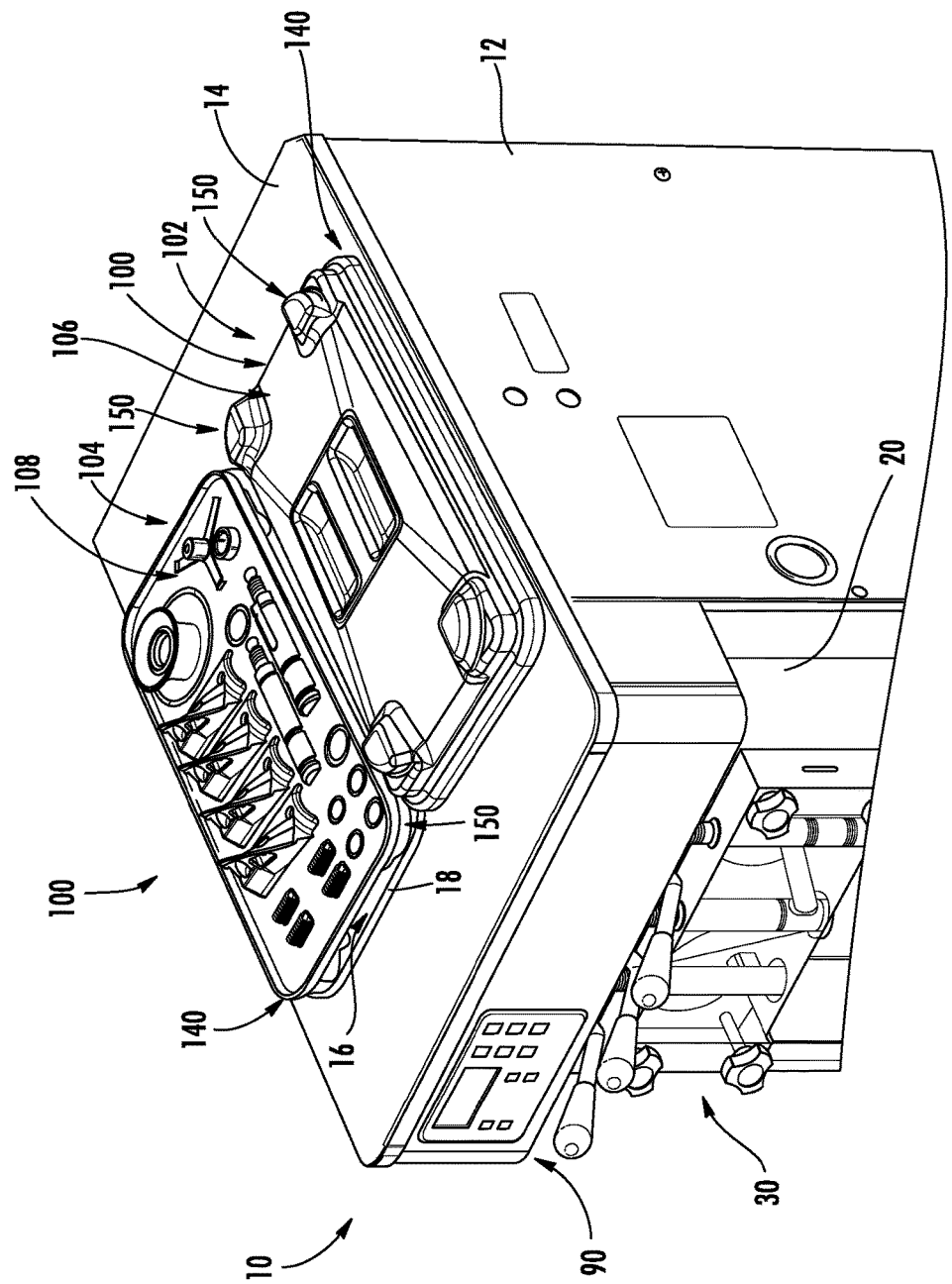
FIG. 3 is a perspective view of the two-barrel dispensing machine of FIG. 1 including hopper covers, according to an exemplary embodiment.

As shown in FIGS. 1-3, the dispensing machine 10 includes a main body, shown as body 12, a first surface, shown as top surface 14, and a second surface, shown as front surface 20. The top surface 14 defines a plurality of openings or cavities, shown as hopper cavities 16, that provide access to an interior of the body 12 of the dispensing machine 10. According to an exemplary embodiment, the hopper cavities 16 facilitate pouring a frozen treat mixture, a frozen yogurt mixture, an ice-cream mixture, a frozen custard mixture, a slushie mixture, and/or another type of mixture into the dispensing machine 10. As shown in FIGS. 1-3, the hopper cavities 16 have an inner, peripheral wall, shown as hopper wall 19, and a retaining structure, shown as lip 18, extending outward from the top surface 14 and around the hopper wall 19 of each hopper cavity 16. In other embodiments, the lip 18 is a depression defined by the top surface 14 that extends around the hopper wall 19 of each hopper cavity 16. In alternate embodiments, the lip 18 is omitted (e.g., another type of retaining structure may be included, etc.).

As shown in FIGS. 1-3, the dispensing machine 10 includes a dispensing system, shown as dispensing system 30. According to an exemplary embodiment, the dispensing system 30 allows a user (e.g., customer, worker, etc.) to dispense a frozen treat, frozen yogurt, ice-cream, frozen custard, a slushie, and/or the like from the dispensing machine 10. A shown in FIGS. 1-3, the dispensing system 30 includes a cover, shown as front door 32, that defines a plurality of apertures, shown as through-holes 36. According to an exemplary embodiment, the front door 32 is selectively attached (e.g., coupled, fastened, etc.) to the front surface 20 of the dispensing machine 10. As shown in FIGS. 1-3, the dispensing system 30 includes levers, shown as dispensing handles 34, that allow a user to activate the dispensing feature of the dispensing machine 10 (e.g., through manual actuation of the dispensing handles 34, etc.). In other embodiments, the dispensing feature of the dispensing machine 10 is otherwise activated (e.g., with push-buttons, automatically activated based on sensing a cup, bowl, or cone positioned beneath the dispensing system 30, etc.).

As shown in FIG. 2, the front surface 20 defines a plurality of apertures, shown as barrel cylinders 22. According to an exemplary embodiment, the number of barrel cylinders 22 corresponds with the number of hopper cavities 16. As shown in FIG. 2, the dispensing system 30 includes a plurality of barrel assemblies, shown as auger assemblies 40. According to an exemplary embodiment, the number of auger assemblies 40 corresponds with the number of barrel cylinders 22. As shown in FIG. 2, each barrel cylinder 22 is configured to receive one of the auger assemblies 40. According to an exemplary embodiment, the auger assemblies 40 are configured to rotate within the barrel cylinders 22 to mix the mixtures poured into the dispensing machine 10 via the hopper cavities 16.

As shown in FIG. 2, the auger assemblies 40 include a plurality of components or parts including a shaft, shown as auger shaft 42; scrapers, shown as flights 44; resilient members, shown as springs 46; a support, shown as front support 48; a bushing, shown as front bushing 50; an O-ring, shown as auger O-ring 52; a seal, shown as rear seal 54; first valves, shown as valves 56, with corresponding O-rings, shown as valve O-rings 58; and a second valve, shown as center valve 60, with corresponding O-rings, shown as valve O-ring 62 and valve O-rings 64. The flights 44 are configured to couple to the auger shaft 42 and scrape the peripheral wall of the respective barrel cylinder 22. The springs 46 are configured to keep pressure between the flights 44 and the peripheral wall of the barrel cylinder 22 to aid in the scraping of the peripheral wall. The front bushing 50 is configured to couple the front support 48 to the auger shaft 42, and the front support 48 is configured to center the auger shaft 42 and the components attached thereto within the barrel cylinder 22. The auger O-ring 52 and the rear seal 54 press against the back of the barrel cylinder 22 to seal the auger assembly 40 within barrel cylinder 22.

According to an exemplary embodiment, the valves 56 and the center valve 60 are disposed within the through-holes 36 of the front door 32. The valve O-rings 58, 62, and 64 form a valve seal between the through-holes 36 and the valves 56 and the center valve 60, respectively. The valves 56 and the center valve 60 are coupled to the dispensing handles 34. The valves 56 and the center valve 60 are configured to control the flow of the mixture out of the dispensing machine 10, according to an exemplary embodiment. By way of example, one of the valves 56 may control the flow of mixture out of a first hopper cavity 16, the other of the valves 56 may control the flow of mixture out of a second hopper cavity 16, and the center valve 60 may control the flow of mixture out of both the first and the second hopper cavities 16 (e.g., a combination or swirl, etc.).

As shown in FIGS. 1-3, the dispensing machine 10 further includes a user interface, shown as user interface 90. In one embodiment, the user interface 90 includes a display and an operator input. The display may be configured to display a graphical user interface, an image, an icon, or still other information. In one embodiment, the display includes a graphical user interface configured to provide general information about the dispensing machine 10 (e.g., mixture levels, mixture temperature, etc.). The graphical user interface may also be configured to display an indication that the dispensing system 30 is due for cleaning, maintenance, and/or repair. The operator input may be used by an operator to provide commands to the dispensing machine 10 (e.g., a desired temperature of the mixture, etc.). The operator input may include one or more buttons, knobs, touchscreens, switches, levers, joysticks, pedals, and/or handles. The operator may be able to manually control some or all aspects of the operation of dispensing machine 10 using the display and the operator input.

As shown in FIG. 3, the hopper cover 100 is capable of being selectively oriented into one of a first orientation, shown as cover orientation 102, and a second orientation, shown as disassembly orientation 104. As shown in FIGS. 3-4G, the hopper cover 100 includes a first side, shown as exterior side 106; an opposing second side, shown as interior side 108; an extension member, shown as rim 140, extending around the periphery of the hopper cover 100; and a plurality of legs, shown as feet 150. As shown in FIG. 3, the hopper cover 100 is configured to extend across (e.g., fit over, etc.) the hopper cavity 16. As shown in FIGS. 3-4G, the hopper cover 100 is substantially rectangular in shape. In other embodiments, the hopper cover 100 is otherwise shaped (e.g., circular, oval, square, etc.). According to an exemplary embodiment, the hopper cover 100 is shaped to correspond with the shape of the hopper cavity 16, the hopper wall 19, and/or the lip 18.

As shown in FIG. 3, the interior side 108 of the hopper cover 100 faces inside of the hopper cavity 16 with the rim 140 engaging the lip 18, thereby covering the hopper cavity 16 when the hopper cover 100 is positioned over the hopper cavity 16 while in the cover orientation 102. According to an exemplary embodiment, the interaction between the lip 18 and the rim 140 prevents the hopper cover 100 from inadvertently moving (e.g., sliding, falling off of the top surface 14, etc.) when positioned over the hopper cavity 16 in the cover orientation 102. In some embodiments, the rim 140 and/or another portion of the hopper cover 100 engages with another retaining structure (e.g., latches, fasteners, clips, etc.) to prevent inadvertent movement of the hopper cover 100 when positioned over the hopper cavity 16 in the cover orientation 102. In some embodiments, the rim 140 is omitted.

As shown in FIG. 3, the exterior side 106 of the hopper cover 100 faces inside of the hopper cavity 16 with the feet 150 extending therein and engaging with at least one of the lip 18 and the hopper wall 19, thereby facilitating organized disassembly and reassembly of the dispensing machine 10 (e.g., during cleaning, maintenance, and/or repair of the dispensing machine 10, etc.) when the hopper cover 100 is positioned over the hopper cavity 16 while in the disassembly orientation 104. According to an exemplary embodiment, the interaction between the lip 18, the hopper wall 19, and/or the feet 150 prevents the hopper cover 100 from inadvertently moving (e.g., sliding, falling off of the top surface 14, etc.) when positioned over the hopper cavity 16 in the disassembly orientation 104. In some embodiments, the feet 150 and/or another portion of the hopper cover 100 engages with another retaining structure (e.g., latches, fasteners, clips, etc.) to prevent inadvertent movement of the hopper cover 100 when positioned over the hopper cavity 16 in the disassembly orientation 104.

Figure 4A:
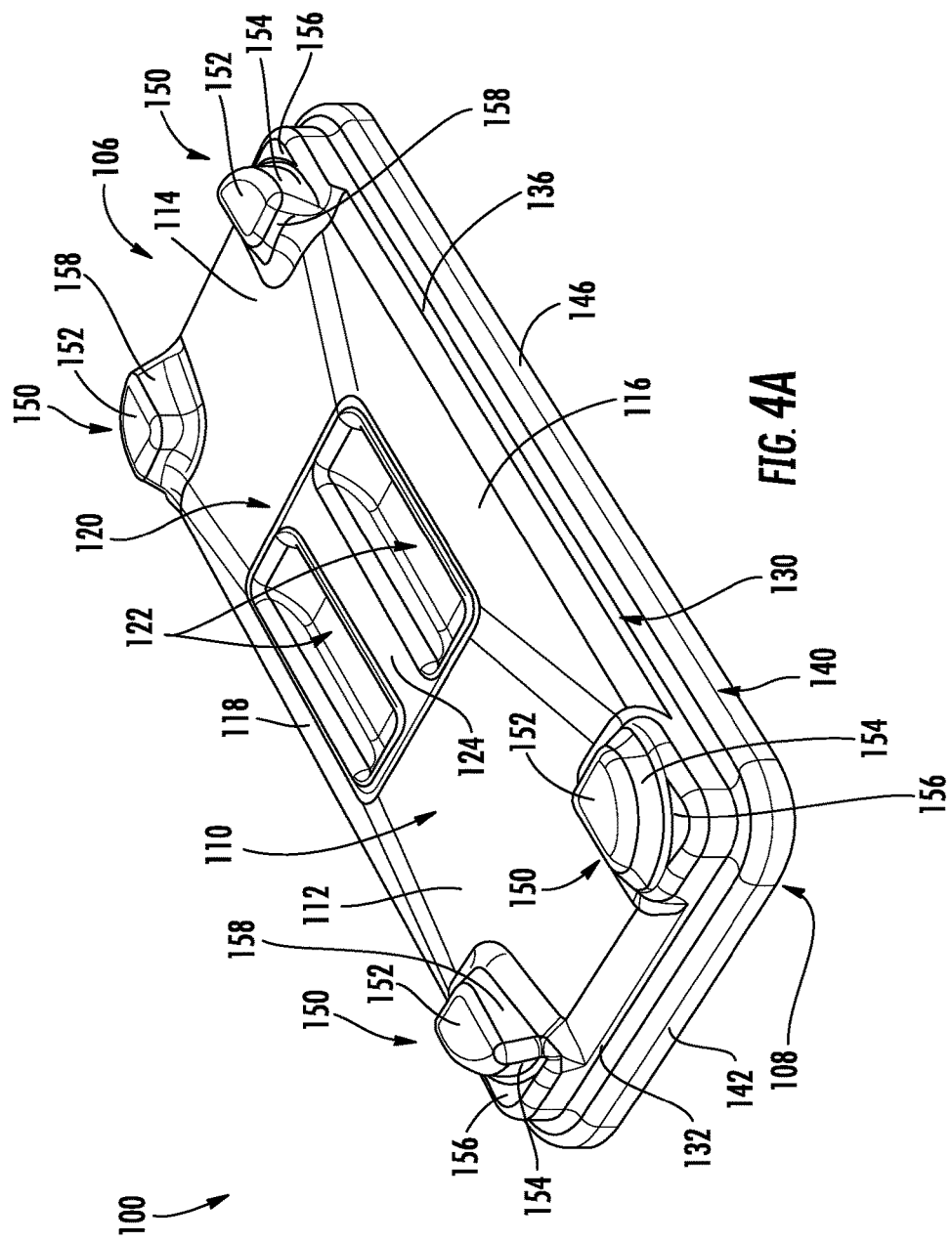

As shown in FIGS. 4A-4D, the exterior side 106 of the hopper cover 100 has a surface, shown as exterior surface 110. As shown in FIGS. 4A and 4C-4D, the exterior surface 110 defines a centrally located handle portion, shown as handle portion 120. In other embodiments, the handle portion 120 is otherwise positioned about the exterior surface 110 (e.g., along each lateral edge, along each longitudinal edge, etc.). As shown in FIGS. 4A-4B and 4D, the handle portion 120 includes a pair of recesses, shown as handle recesses 122, and a grip, shown as handle grip 124. According to an exemplary embodiment, the handle recesses 122 and the handle grip 124 cooperatively facilitate lifting and handling the hopper cover 100 from the exterior side 106 (e.g., lifting the hopper cover 100 off of the dispensing machine 10 when the hopper cover 100 is positioned over the hopper cavity 16, etc.).

As shown in FIGS. 4A-4D, the exterior side 106 of the hopper cover 100 includes an edge, shown as peripheral edge 130, that extends around the periphery of the hopper cover 100. The peripheral edge 130 is defined by a first lateral edge, shown as front edge 132, a second lateral edge, shown as rear edge 134, a first longitudinal edge, shown as left edge 136, and a second longitudinal edge, shown as right edge 138. As shown in FIGS. 4A-4G, the rim 140 is positioned around peripheral edge 130 and extends therefrom. The rim 140 is defined by a first lateral portion, shown as front rim portion 142, a second lateral portion, shown as rear rim portion 144, a first longitudinal portion, shown as left rim portion 146, and a second longitudinal portion, shown as right rim portion 148. According to an exemplary embodiment, the front rim portion 142, the rear rim portion 144, the left rim portion 146, and the right rim portion 148 have a uniform height (e.g., the rim 140 has a flat edge, etc.). In other embodiments, at least one of the front rim portion 142, the rear rim portion 144, the left rim portion 146, and the right rim portion 148 have a different height (e.g., defining a notched shape in the rim 140, etc.) and/or a non-flat edge (e.g., wavy, dome-shaped, etc.). In alternative embodiments, at least one of the front rim portion 142, the rear rim portion 144, the left rim portion 146, and the right rim portion 148 are omitted.

As shown in FIGS. 4A-4D, the exterior surface 110 includes a first surface, shown as front surface 112, a second surface, shown as rear surface 114, a third surface, shown as left surface 116, and a fourth surface, shown as right surface 118. According to the exemplary embodiment shown in FIGS. 4A-4D, the front surface 112, the rear surface 114, the left surface 116, and the right surface 118 extend linearly at angle from the handle portion 120 to the front edge 132, the rear edge 134, the left edge 136, and the right edge 138 of the peripheral edge 130, respectively (e.g., the handle portion 120 is offset relative to the peripheral edge 130, etc.). The angled configuration of the front surface 112, the rear surface 114, the left surface 116, and/or the right surface 118 provides a run-off capability of the hopper cover 100 (e.g., for condensation, spilt mixture, etc.). In other embodiments, at least one of the front surface 112, the rear surface 114, the left surface 116, and the right surface 118 are flat (e.g., the handle portion 120 is coplanar or aligned with the peripheral edge 130, etc.). In still other embodiments, at least one of the front surface 112, the rear surface 114, the left surface 116, and the right surface 118 extend non-linearly (e.g., curved, dome-shaped, etc.) from the handle portion 120 to the front edge 132, the rear edge 134, the left edge 136, and the right edge 138 of the peripheral edge 130, respectively.

As shown in FIGS. 4A-4D, the feet 150 extend from the exterior surface 110. According to the exemplary embodiment shown in FIGS. 4A-4D, the feet 150 are positioned at each corner of the exterior side 106 of the hopper cover 100. In other embodiments, the feet 150 form a single, continuous base or foot that extends around the peripheral edge 130. In still other embodiments, the exterior side 106 includes feet 150, additionally or alternatively, positioned along at least one of the front edge 132, the rear edge 134, the left edge 136, and the right edge 138 (e.g., not at the corners, etc.). In an alternative embodiment, the feet 150 are omitted.

As shown in FIGS. 4A-4D, the feet 150 include a first face, shown as bottom surface 152, a second face, shown as first interaction surface 154, a third face, shown as second interaction surface 156, and a fourth face, shown as rear surface 158. According to an exemplary embodiment, the bottom surface 152 of the feet 150 is flat and configured to rest upon a surface such as a counter, table, or the like. As shown in FIGS. 4A and 4C-4D, first interaction surface 154 and the rear surface 158 offset the bottom surface 152 from the exterior surface 110 and the second interaction surface 156. According to an exemplary embodiment, the hopper cover 100 may stand on the feet 150 when the exterior side 106 is oriented downwards (e.g., the exterior side 106 faces a surface such as a table or counter, the hopper cover 100 is in oriented in the disassembly orientation 104, etc.). The feet 150 may thereby elevate the exterior surface 110 of the hopper cover 100 above a surface when the bottom surfaces 152 of the feet 150 are resting upon the surface.

As shown in FIG. 3, the feet 150 are positioned about the exterior surface 110 of the hopper cover 100 to fit within the hopper cavity 16 when the hopper cover 100 is oriented in the disassembly orientation 104. According to an exemplary embodiment, the first interaction surfaces 154 of the feet 150 are shaped to correspond with the shape of the hopper wall 19. The first interaction surfaces 154 of the feet 150 may thereby be configured to abut the hopper wall 19 of the hopper cavity 16 when the feet 150 are disposed within the hopper cavity 16. According to an exemplary embodiment, the second interaction surfaces 156 of the feet 150 are configured to rest on the lip 18 of the hopper cavity 16 when the feet 150 are disposed within the hopper cavity 16. In some embodiments, at least one of the first interaction surface 154 and the second interaction surface 156 of the feet 150 are shaped to correspond with the lip 18 and/or the hopper wall 19 of the hopper cavity 16 of the dispensing machine 10.

Figure 4E:
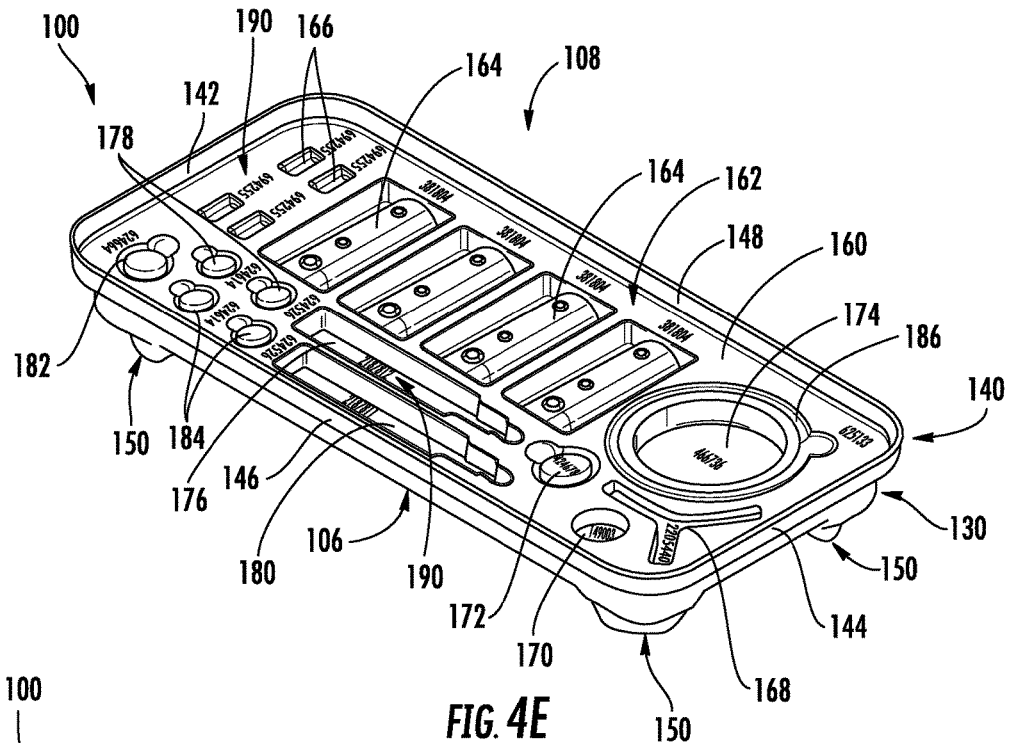
Figure 4F:
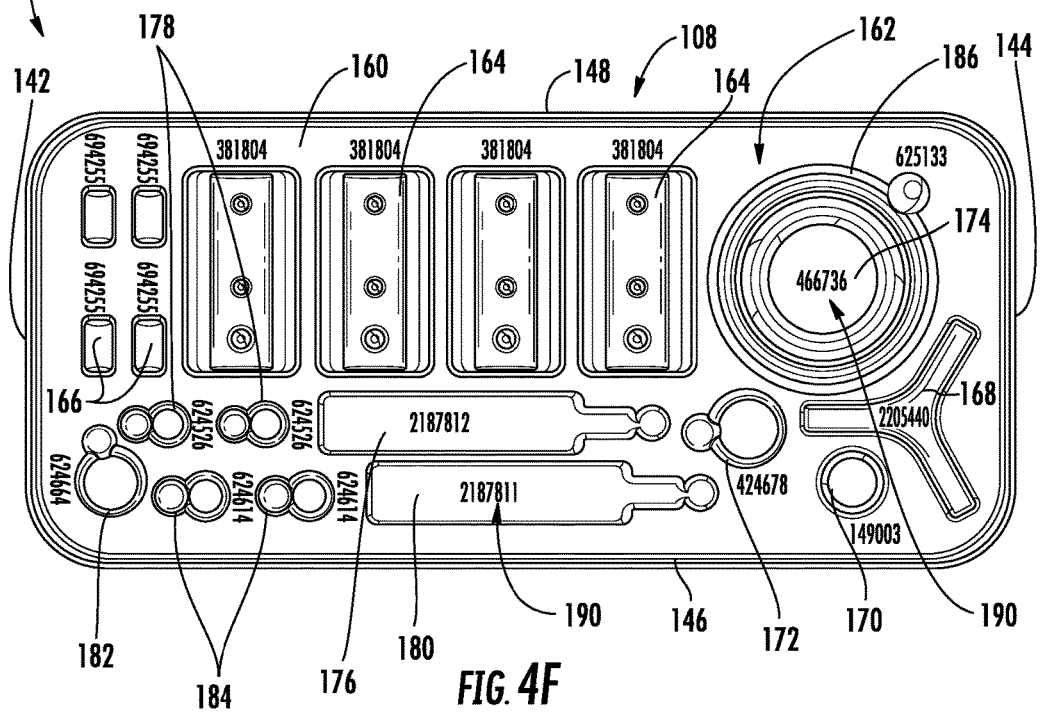
Figure 4G:
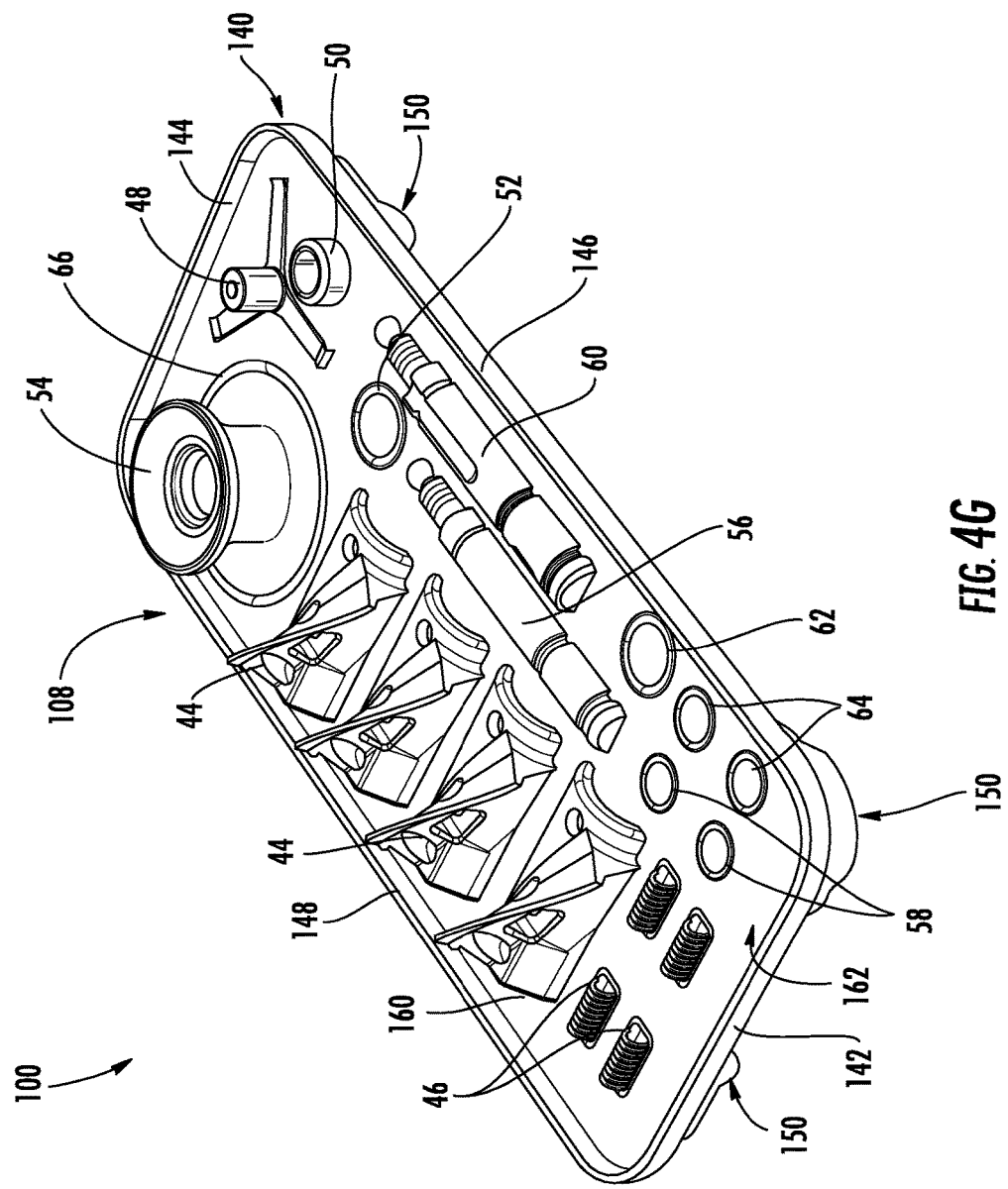

As shown in FIGS. 4E-4G, the interior side 108 of the hopper cover 100 has a surface, shown as interior surface 160. As shown in FIGS. 4E and 4G, the rim 140 extends past the interior surface 160 of the interior side 108 such that the interior surface 160 is recessed relative to an edge (e.g., the outermost portion, etc.) of the rim 140. According to an exemplary embodiment, the rim 140 forms a wall extending around the periphery of the interior surface 160, defining a cavity therebetween, shown as recess 162. In some embodiments, the interior face of the wall of the rim 140 extends at an angle from the interior surface 160 (e.g., linearly, etc.). In some embodiments, the interior face of the wall of the rim 140 extends normal (i.e., perpendicular) to the interior surface 160. In some embodiments, the interior face of the wall of the rim 140 is curved or otherwise shaped (e.g., non-linear, etc.).

As shown in FIGS. 4E-4G, the interior surface 160 defines a plurality of recesses, shown as depressions 164-186. According to an exemplary embodiment, the depressions 164-186 are configured to receive a plurality of components of the dispensing machine 10. Each of the depressions 164-186 may corresponds with a specific component of the plurality of components of the dispensing machine 10. As shown in FIGS. 3 and 4G, the depressions 164-186 are shaped to receive a plurality of components of the dispensing system 30 and/or the auger assembly 40 of the dispensing machine 10 such that the plurality of components are disposed within the recess 162. More specifically, as shown in FIGS. 4E-4G, the depressions 164 are shaped to receive the flights 44; the depression 166 are shaped to receive the springs 46; the depression 168 is shaped to receive the front support 48; the depression 170 is shaped to receive the front bushing 50; the depression 172 is shaped to receive the auger O-ring 52; the depression 174 is shaped to receive the rear seal 54; the depressions 176 and the depressions 178 are shaped to receive one of the valves 56 and the corresponding valve O-rings 58, respectively; the depressions 180, the depression 182, and the depressions 184 are shaped to receive the center valve 60 and the corresponding valve O-ring 62 and valve O-rings 64, respectively; and the depression 186 is shaped to receive an O-ring, shown as front door seal 66. In some embodiments, the interior surface 160 defines more or fewer recesses or depressions to receive more components (e.g., the auger shaft 42, the front door 32, etc.) or fewer components of the dispensing machine 10. In an alternative embodiment, the interior surface 160 is flat (e.g., does not define the depressions 164-186, etc.).

According to an exemplary embodiment, recessing interior surface 160 prevents the mixture (e.g., frozen yogurt mixture on the removed components, etc.) that may drip from the components of the dispensing machine 10 from sliding off of the interior surface 160 during transport and/or cleaning. According to an exemplary embodiment, the interior surface 160 having individual depressions for each respective component provides a securing feature. For example, the depressions 164-186 may help to secure the components of the dispensing machine 10 within the recess 162 of the hopper cover 100 (e.g., prevent the components from sliding around, etc.). In another example, the depressions 164-186 may help evenly distribute the weight of the components across the hopper cover 100 such that the hopper cover 100 is easier to carry and handle while the components of the dispensing machine 10 are disposed within the depressions 164-186.

As shown in FIGS. 4E-4F, the interior surface 160 defines a plurality of indicia, shown as indicia 190, positioned near and/or within each of the depressions 164-186. According to an exemplary embodiment, the indicia 190 include an identification number (e.g., part number, serial number, etc.) to identify the component that is received within the respective depression. Each of the indicia 190 may correspond with a specific component of the plurality of components of the dispensing machine 10. According to an exemplary embodiment, the interior surface 160 having individual depressions and/or indicia for each respective component provides a poka-yoke feature. For example, each of the depressions 164-186 structured to receive a specific component of the dispensing machine 10 and/or the indicia 190 may provide an indication of which components are currently removed and/or installed within the dispensing machine 10. This may help an operator both in assembly and disassembly of the dispensing machine 10. The hopper cover 100 may thereby provide an organizational tool for use when cleaning, maintaining, and/or repairing the dispensing machine 10. In another example, the indicia 190 may aid an operator in ordering damaged and/or worn components (e.g., aids in identifying the part number of the component for ordering purposes, etc.). In some embodiments, the hopper cover 100 may be provided with respective components of the dispensing machine 10 as a maintenance kit. For example, the maintenance kit may include the hopper cover 100 and various wear components (e.g., the front bushing 50, the O-rings 52, 58, 62, 64, and/or 66, etc.) to be used in periodic maintenance of the dispensing machine 10 (e.g., every six months, etc.).

Figure 5A:
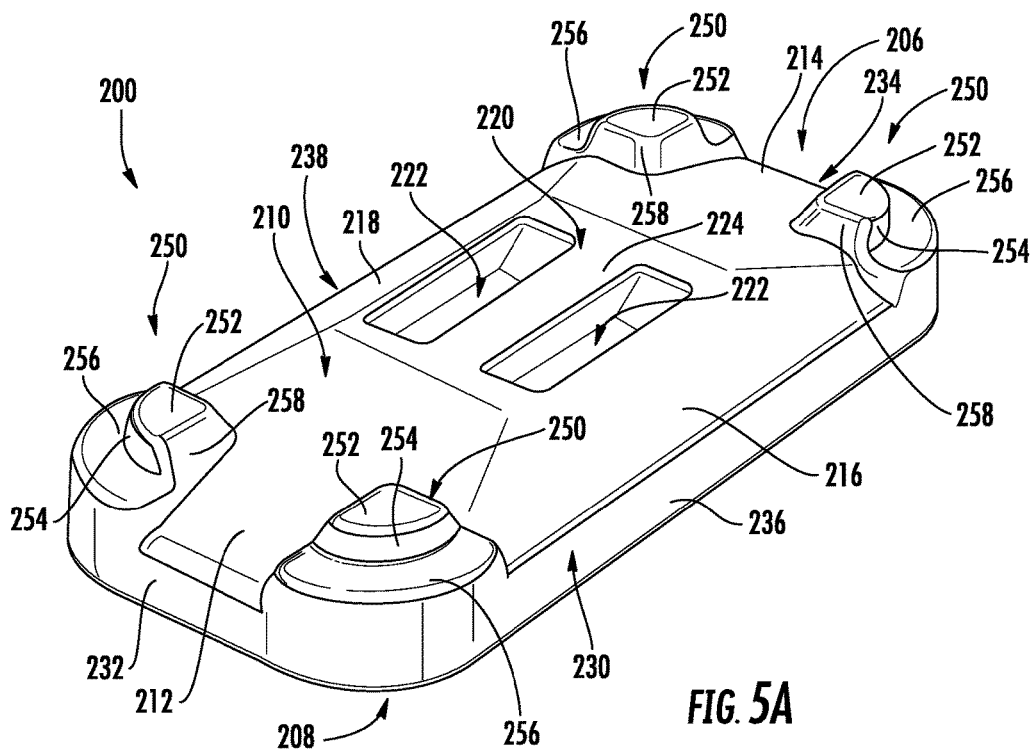
FIGS. 5A-5B are various views of a hopper cover, according to another exemplary embodiment.
Figure 5B:
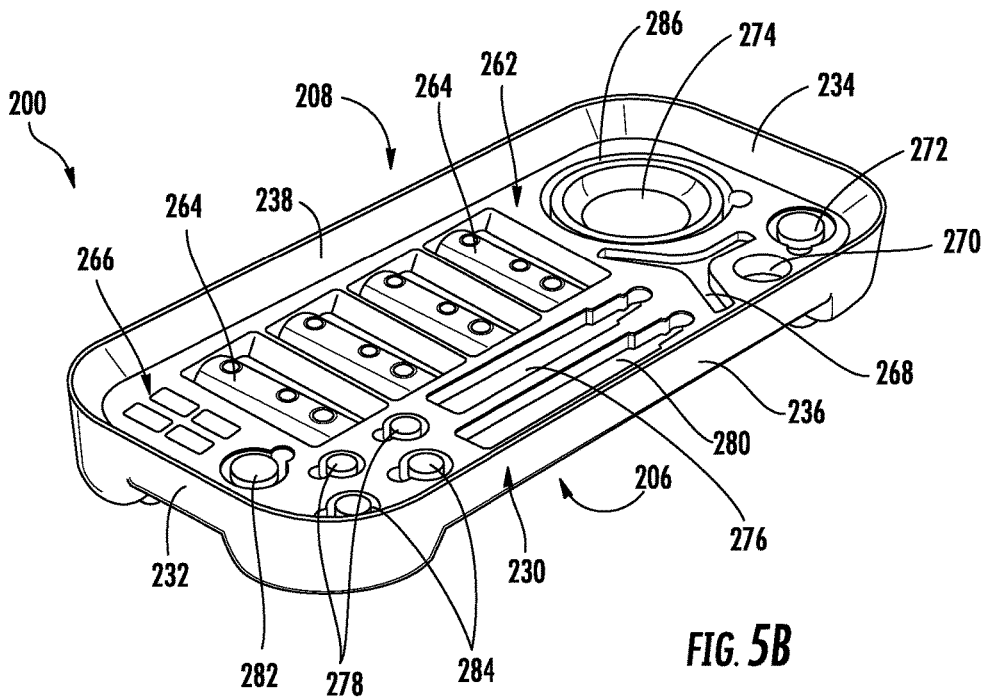

According to the exemplary embodiment shown in FIGS. 5A-5B, a multi-functional cover, shown as hopper cover 200, is configured to be used with a dispensing machine (e.g., the dispensing machine 10, etc.) to assist, sort, track, and/or organize the disassembly, cleaning, and assembly of the dispensing machine. The structure and function of the hopper cover 200 may be similar to that of the hopper cover 100 described above in regards to FIGS. 1-4G. As shown in FIGS. 5A-5B, the hopper cover 200 includes a first side, shown as exterior side 206; an opposing second side, shown as interior side 208; and a plurality of legs, shown as feet 250. According to the exemplary embodiment, the hopper cover 200 is substantially rectangular in shape. In other embodiments, the hopper cover 200 is otherwise shaped (e.g., circular, oval, square, etc.). According to an exemplary embodiment, the hopper cover 200 is shaped to correspond with the shape of the hopper cavity 16, the hopper wall 19, and/or the lip 18 of the dispensing machine 10.

As shown in FIG. 5A, the exterior side 206 of the hopper cover 200 has a surface, shown as exterior surface 210. The exterior surface 210 defines a centrally located handle portion, shown as handle portion 220. In other embodiments, the handle portion 220 is otherwise positioned about the exterior surface 210 (e.g., along each lateral edge, along each longitudinal edge, etc.). As shown in FIG. 5A, the handle portion 220 includes a pair of recesses, shown as handle recesses 222, and a grip, shown as handle grip 224. According to an exemplary embodiment, the handle recesses 222 and the handle grip 224 cooperatively facilitate lifting and handling the hopper cover 200 from the exterior side 206.

As shown in FIG. 5A, the exterior side 206 of the hopper cover 200 includes an edge, shown as peripheral wall 230, that extends around the periphery of the hopper cover 200. The peripheral wall 230 is defined by a first lateral edge, shown as front wall 232, a second lateral edge, shown as rear wall 234, a first longitudinal edge, shown as left wall 236, and a second longitudinal edge, shown as right wall 238. According to an exemplary embodiment, the front wall 232, the rear wall 234, the left wall 236, and the right wall 238 have a uniform height (e.g., the peripheral wall 230 has a flat edge, etc.). In other embodiments, at least one of the front wall 232, the rear wall 234, the left wall 236, and the right wall 238 have a different height (e.g., defining a notched shape in the peripheral wall 230, etc.) and/or a non-flat edge (e.g., wavy, dome-shaped, etc.). In alternative embodiments, at least one of the front wall 232, the rear wall 234, the left wall 236, and the right wall 238 are omitted.

According to an exemplary embodiment, the peripheral wall 230 is configured to engage the lip 18 of the hopper cavity 16. The interaction between the lip 18 and the peripheral wall 230 may prevent the hopper cover 200 from inadvertently moving (e.g., sliding, falling off of the top surface 14, etc.) when positioned over the hopper cavity 16. In some embodiments, the peripheral wall 230 and/or another portion of the hopper cover 200 engages with another retaining structure (e.g., latches, fasteners, clips, etc.) to prevent inadvertent movement of the hopper cover 200 when positioned over the hopper cavity 16.

As shown in FIG. 5A, the exterior surface 210 includes a first surface, shown as front surface 212, a second surface, shown as rear surface 214, a third surface, shown as left surface 216, and a fourth surface, shown as right surface 218. According to the exemplary embodiment shown in FIG. 5A, the front surface 212, the rear surface 214, the left surface 216, and the right surface 218 extend linearly at angle from the handle portion 220 to the front edge 132, the rear edge 134, the left edge 136, and the right edge 138 of the peripheral edge 130, respectively. The angled configuration of the front surface 212, the rear surface 214, the left surface 216, and/or the right surface 218 provides a run-off capability of the hopper cover 200 (e.g., for condensation, spilt mixture, etc.). In other embodiments, at least one of the front surface 212, the rear surface 214, the left surface 216, and the right surface 218 are flat (e.g., the handle portion 220 is coplanar or aligned with the peripheral wall 230, etc.). In still other embodiments, at least one of the front surface 212, the rear surface 214, the left surface 216, and the right surface 218 extend non-linearly (e.g., curved, dome-shaped, etc.) from the handle portion 220 to the peripheral wall 230.

As shown in FIG. 5A, the feet 250 extend from the exterior surface 210. According to the exemplary embodiment shown in FIG. 5A, the feet 250 are positioned at each corner of the exterior side 206 of the hopper cover 200. In other embodiments, the feet 250 from a single, continuous base or foot that extends around the peripheral wall 230. In still other embodiments, the exterior side 206 includes feet 250, additionally or alternatively, positioned along at least one of the front wall 232, the rear wall 234, the left wall 236, and the right wall 238 (e.g., not at the corners, etc.). In an alternative embodiment, the feet 250 are omitted.

As shown in FIG. 5A, the feet 250 include a first face, shown as bottom surface 252, a second face, shown as first interaction surface 254, a third face, shown as second interaction surface 256, and a fourth face, shown as rear surface 258. According to an exemplary embodiment, the bottom surface 252 of the feet 250 is flat and configured to rest upon a surface such as a counter, table, or the like. As shown in FIG. 5A, the first interaction surface 254 and the rear surface 258 offset the bottom surface 252 from the exterior surface 210 and the second interaction surface 256. According to an exemplary embodiment, the hopper cover 200 may stand on the feet 250 when the exterior side 206 is oriented downwards (e.g., the exterior side 206 faces a surface such as a table or counter, etc.). The feet 250 may thereby elevate the exterior surface 210 of the hopper cover 200 above a surface when the bottom surfaces 252 of the feet 250 are resting upon the surface.

According to an exemplary embodiment, the feet 250 are positioned about the exterior surface 210 of the hopper cover 200 to fit within the hopper cavity 16. By way of example, the first interaction surfaces 254 of the feet 250 may be shaped to correspond with the shape of the hopper wall 19. The first interaction surfaces 254 of the feet 250 may thereby be configured to abut the hopper wall 19 of the hopper cavity 16 when the feet 250 are disposed within the hopper cavity 16. By way of another example, the second interaction surfaces 256 of the feet 250 may be configured to rest on the lip 18 of the hopper cavity 16 when the feet 250 are disposed within the hopper cavity 16. In some embodiments, at least one of the first interaction surface 254 and the second interaction surface 256 of the feet 250 are shaped to correspond with the lip 18 and/or the hopper wall 19 of the hopper cavity 16 of the dispensing machine 10.

As shown in FIG. 5B, the interior side 208 of the hopper cover 200 has a surface, shown as interior surface 260. As shown in FIG. 5B, the peripheral wall 230 extends past the interior surface 260 of the interior side 208 such that the interior surface 260 is recessed relative to an edge (e.g., the outermost portion, etc.) of the peripheral wall 230. According to an exemplary embodiment, the peripheral wall 230 forms a wall extending around the periphery of the interior surface 260, defining a cavity therebetween, shown as recess 262. In some embodiments, the interior face of the peripheral wall 230 extends at an angle from the interior surface 260 (e.g., linearly, etc.). In some embodiments, the interior face of the peripheral wall 230 extends normal (i.e., perpendicular) to the interior surface 260. In some embodiments, the interior face of the peripheral wall 230 is curved or otherwise shaped (e.g., non-linear, etc.).

As shown in FIG. 5B, the interior surface 260 defines a plurality of recesses, shown as depressions 264-286. According to an exemplary embodiment, the depressions 264-286 are configured to receive a plurality of components of the dispensing machine 10 such that the plurality of components are disposed within the recess 262. Each of the depressions 264-286 may corresponds with a specific component of the plurality of components of the dispensing machine 10. According to an exemplary embodiment, the interior surface 260 having individual depressions for each respective component provides a securing feature. For example, the depressions 264-286 may help to secure the components of the dispensing machine 10 within the recess 262 of the hopper cover 200 (e.g., prevent the components from sliding around, etc.). In another example, the depressions 264-286 may help evenly distribute the weight of the components across the hopper cover 200 such that the hopper cover 200 is easier to carry and handle while the components of the dispensing machine 10 are disposed within the depressions 264-286. According to an exemplary embodiment, the interior surface 260 having individual depressions for each respective component provides a poka-yoke feature. For example, each of the depressions 264-286 being structured to receive a specific component of the dispensing machine 10 may provide an indication of which components are currently removed and/or installed within the dispensing machine 10. This may help an operator both in assembly and disassembly of the dispensing machine 10. The hopper cover 200 may thereby provide an organizational tool for use when cleaning, maintaining, and/or repairing the dispensing machine 10.

According to an exemplary embodiment, the hopper cover 100 and/or the hopper cover 200 are manufactured using a solid molded manufacturing process, a blow molded manufacturing process, and/or an injection molded manufacturing process. In other embodiments, the hopper cover 100 and/or the hopper cover 200 are otherwise manufactured (e.g., cast, machined, welded, etc.). According to an exemplary embodiment, the hopper cover 100 and/or the hopper cover 200 are manufactured from a material that satisfies various Food and Drug Administration (FDA) requirements for food contact. For example, the hopper cover 100 and/or the hopper cover 200 may be manufactured from expanded polypropylene (EPP) and/or Acrylonitrile Butadiene Styrene (ABS). In other embodiments, the hopper cover 100 and/or the hopper cover 200 are manufactured from another material (e.g., another plastic material, a metal material, a ceramic material, a composite material, glass, wood, a rigid material, a semi-rigid material, a flexible material, etc.). According to an exemplary embodiment, the exterior surface 110 and/or the interior surface 160 have a haircell texture. In other embodiments, the exterior surface 110 and/or the interior surface 160 have another type of texture (e.g., smooth, bumpy, rough, dimpled, etc.).

Figure 6:
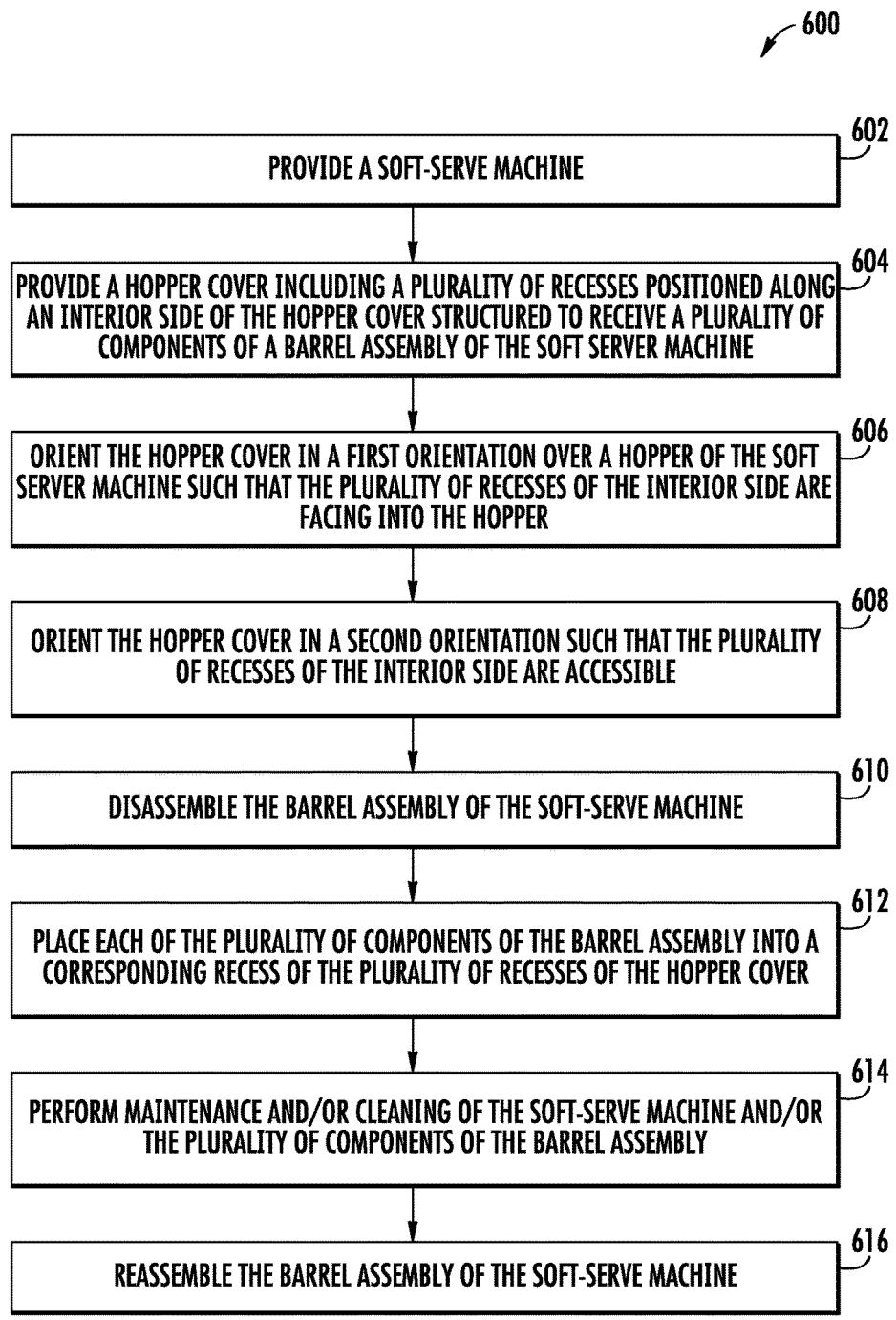
FIG. 6 is a flow diagram of a method for performing maintenance on and/or cleaning of a dispensing machine and/or a barrel assembly of the dispensing machine with the assistance of a hopper cover, according to an exemplary embodiment.

Referring now to FIG. 6, a method 600 for performing maintenance on and/or cleaning of a dispensing machine with the assistance of a hopper cover is shown according to an example embodiment. Method 600 may correspond with the dispensing machine 10, the hopper cover 100, and/or the hopper cover 200. Accordingly, method 600 may be described in regard to FIGS. 1-5B.

At step 602, a dispensing machine (e.g., the dispensing machine 10, a frozen treat dispensing machine, a soft-serve machine, a frozen yogurt machine, etc.) is provided. At step 604, a hopper cover (e.g., the hopper cover 100, the hopper cover 200, etc.) is provided. According to an exemplary embodiment, the hopper cover includes a plurality of recesses (e.g., the depressions 164-186, the depressions 264-286, etc.) positioned along (e.g., defined by, etc.) an interior side (e.g., the interior surface 160 of the interior side 108, the interior surface 260 of the interior side 208, etc.) of the hopper cover. The plurality of recesses may be configured (e.g., shaped, etc.) to receive a plurality of components of a barrel assembly (e.g., the dispensing system 30, the auger assembly 40, etc.) of the dispensing machine.

At step 606, an operator of the dispensing machine may orient the hopper cover in a first orientation (e.g., the cover orientation 102, etc.) over a hopper (e.g., the hopper cavity 16, etc.) such that the plurality of recesses of the interior side are facing into the hopper. At step 608, the operator of the dispensing machine may orient the hopper cover in a second orientation (e.g., the disassembly orientation 104, etc.) such that the plurality of recesses are accessible. The re-orientation may be in response to the dispensing machine being due for cleaning, service, and/or repair. In some instances, the operator may place the hopper cover over the hopper such that the hopper cover rests on an outer edge of the hopper (e.g., the second interaction surfaces 156, 256 engage the lip 18, etc.). In other instances, the operator may place the hopper cover on a flat surface such as a table or counter such that the hopper cover reset on legs thereof (e.g., the feet 150, the feet 250, etc.).

At step 610, the operator may disassemble to the dispensing machine (e.g., to clean, maintain, and/or service the machine, etc.). At step 612, the operator may place each of the plurality of components of the barrel assembly into a corresponding recess of the plurality of recess of the hopper cover. According to an exemplary embodiment, placing each of the plurality of components of the barrel assembly into a corresponding recess provides an indication of which components are currently removed and which components are not removed from the dispensing machine. At step 614, the operator may then perform maintenance and/or cleaning of the dispensing machine and/or the plurality of components removed from the dispensing machine. At step 616, the operator may reassemble the dispensing machine and then place the hopper cover over the hopper in the first orientation (e.g., until the next maintenance or cleaning event, until the mixture within the dispensing machine needs to be refilled, etc.).

The construction and arrangements of the hopper cover, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions and arrangement of the various exemplary embodiments without departing from the scope of the present invention.

What is claimed is:

1. A hopper cover for a dispensing machine, comprising:
    an exterior side having an exterior surface defining a handle that facilitates lifting the hopper cover from the exterior side; and
    an interior side having an interior surface that defines a plurality of recesses, the plurality of recesses configured to receive a plurality of components of the dispensing machine, wherein each recess of the plurality of recesses corresponds with a specific component of the plurality of components;
    wherein the hopper cover is configured to cover a hopper cavity of the dispensing machine when in a first orientation; and
    wherein the hopper cover is configured to facilitate organized disassembly and reassembly of the dispensing machine when in a second orientation.

2. The hopper cover of claim 1, further comprising a rim extending around a periphery of the hopper cover.

3. The hopper cover of claim 2, wherein the rim is configured to interact with a retaining structure positioned around a periphery of the hopper cavity to prevent the hopper cover from inadvertently moving.

4. The hopper cover of claim 2, wherein the rim extends past the interior surface of the interior side such that the interior surface is recessed relative to an edge of the rim.

5. The hopper cover of claim 1, wherein the exterior surface includes a plurality of surfaces that extend at an angle from the handle to a periphery of the hopper cover.

6. A hopper cover for a dispensing machine, comprising:
an exterior side having an exterior surface and including a plurality of feet extending from the exterior surface; and
an interior side having an interior surface that defines a plurality of recesses, the plurality of recesses configured to receive a plurality of components of the dispensing machine, wherein each recess of the plurality of recesses corresponds with a specific component of the plurality of components;
wherein the hopper cover is configured to cover a hopper cavity of the dispensing machine when in a first orientation; and
wherein the hopper cover is configured to facilitate organized disassembly and reassembly of the dispensing machine when in a second orientation.

7. The hopper cover of claim 6, wherein the plurality of feet are positioned about the exterior surface to fit within the hopper cavity when the hopper cover is in the second orientation.

8. The hopper cover of claim 7, wherein the plurality of feet include a first face configured to abut an inner wall of the hopper cavity and a second face configured to rest on a top edge of the hopper cavity when the plurality of feet are disposed within the hopper cavity.

9. The hopper cover of claim 6, wherein the plurality of feet are structured to elevate the exterior surface of the hopper cover above a surface when the plurality of feet are resting upon the surface.

10. A cover for a dispensing machine, comprising:
a first side including a plurality of feet, the plurality of feet having a face shaped to correspond with at least one of a ledge and an interior surface of an opening of the dispensing machine;
an opposing second side including a surface; and
an extension structure positioned around a periphery of the cover and extending past the surface of the opposing second side, defining a cavity therebetween.

11. The cover of claim 10, wherein the surface of the opposing second side defines a plurality of depressions configured to receive a plurality of components of the dispensing machine such that the plurality of components are disposed within the cavity, wherein each depression of the plurality of depressions corresponds with a specific component of the dispensing machine.

12. The cover of claim 11, wherein the surface of the opposing second side includes a plurality of indicia, wherein one of the plurality of indicia is positioned at least one of near and within each of the plurality of depressions, and wherein each of the plurality of indicia identify one of the plurality of components that is received within each of the plurality of depressions.

13. The cover of claim 10, wherein the extension structure forms a wall around the cavity.

14. The cover of claim 10, wherein the cover is configured to extend over the opening of the dispensing machine.

15. The cover of claim 14, wherein the first side includes a handle that facilitates lifting the cover off of the dispensing machine when the cover is positioned over the opening.

16. The cover of claim 14, wherein the extension structure is configured to engage a lip positioned around a periphery of the opening of the dispensing machine when the cover is positioned over the opening.

17. The cover of claim 10, wherein the cover is configured to facilitate organized disassembly and reassembly of the dispensing machine during at least one of maintenance, repair, and cleaning of the dispensing machine.

* * * * *